Feb. 20, 1940. H. B. W. SNELLING 2,190,688
FOOD PRODUCTS AERATING AND DISPENSING DEVICE
Filed Sept. 11, 1937 2 Sheets-Sheet 1
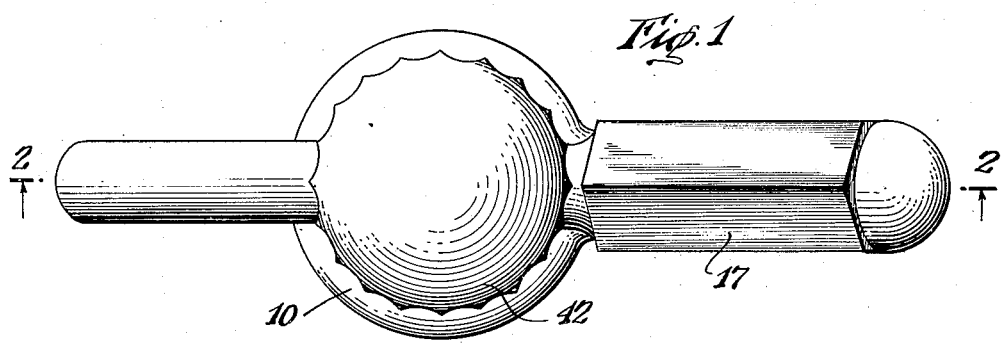
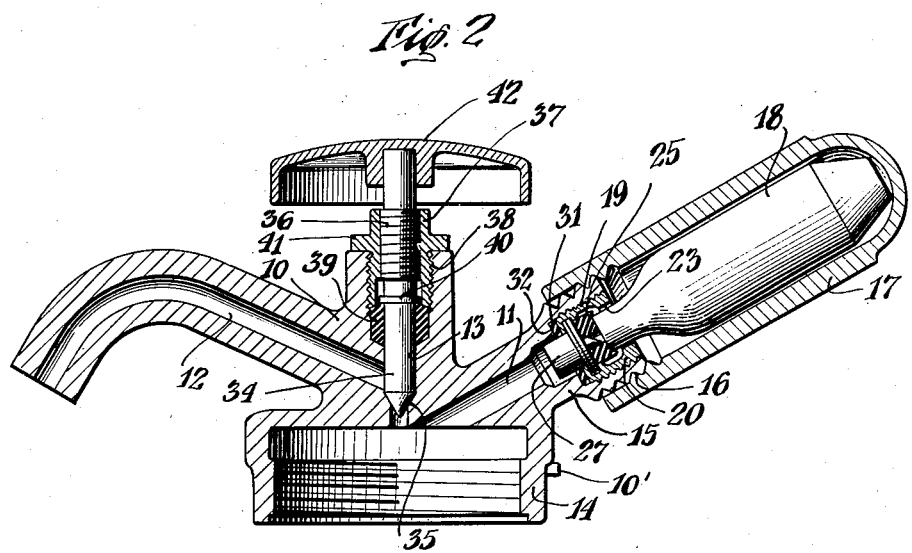
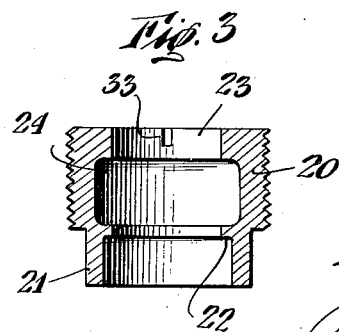
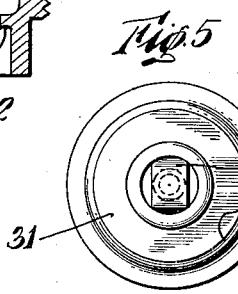
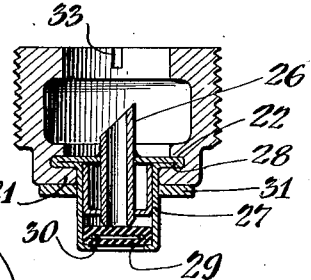
INVENTOR,
Henry B. W. Snelling
BY
Watson, Bristol, Johnson & Leavenworth
ATTORNEYS.

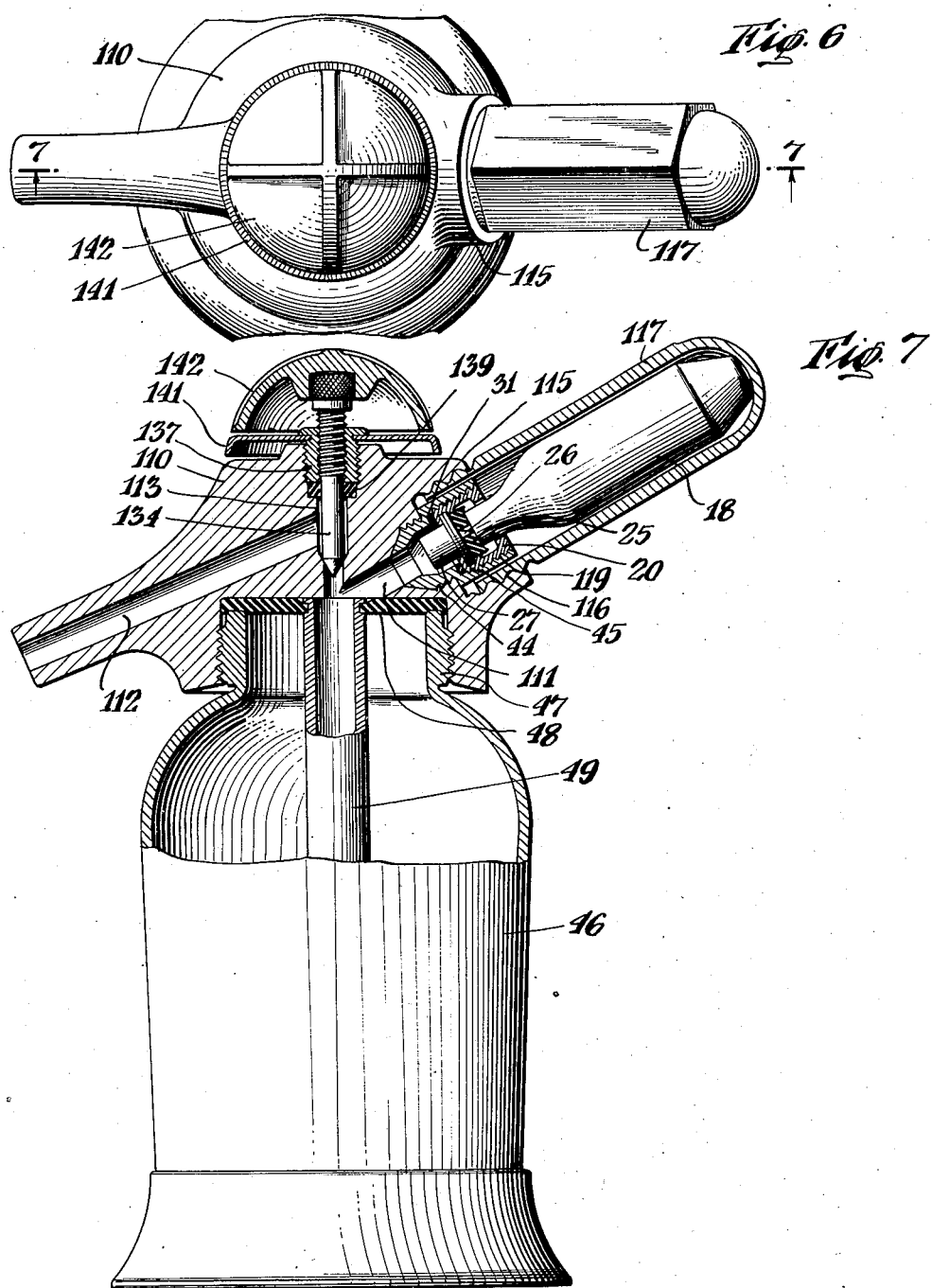

Patented Feb. 20, 1940

2,190,688

UNITED STATES PATENT OFFICE 2,190,688

FOOD PRODUCTS AERATING AND DISPENSING DEVICE

Henry B. W. Snelling, Providence, R. I., assignor to Food Devices Incorporated, New York, N. Y., a corporation of Delaware Application September 11, 1937, Serial No. 163,401

9 Claims. (Cl. 225—18)

This invention relates to devices for aerating and dispensing food products including liquids and flowable creams or pastes. The former may include milk, cream or mixtures of the two, water and various flavored beverages, while the creams or pastes may include mayonnaise, various batters, and the like. For the sake of convenience, such liquids and pastes are hereinafter collectively referred to as food products.

General objects of the invention are to provide such devices having novel features of construction giving improved and more efficient performance, and affording conveniences in operating and cleaning not available with devices heretofore used for similar purposes.

More particularly, objects of the invention are to provide a liquid aerator and dispenser of simple and rugged design having a minimum number of separate parts whereby disassembly and reassembly for cleaning purposes is pronouncedly facilitated.

Further objects of the invention are to provide liquid aerating devices having improved means for rapidly and efficiently introducing a charge of gas from a cartridge to a liquid container without leakage losses, and to provide devices for dispensing aerated liquids such as whipped cream wherein the dispensing valve is subject to fine control and is capable of regulating the rate of emission and the quantity of emitted cream to a precise degree.

A specific object of the invention is to provide such an aerating and dispensing device having a head attachable to or made a part of a fluid container wherein the head or top has a charging valve structure and a dispensing valve structure each in the form of a single unit capable of being mounted on or removed from the head in a single operation.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 1 is a top plan view of the head of a liquid aerating and dispensing device embodying features of the invention;

Fig. 2 is a vertical sectional view along line 2—2 of Fig. 1;

Fig. 3 is a vertical sectional view on an enlarged scale of a charging valve sleeve member prior to its assembly with the valve per se;

Fig. 4 is a vertical sectional view similar to Fig. 3 and showing the valve sleeve member and valve assembled as a unit;

Fig. 5 is a bottom plan view of the unit shown in Fig. 4;

Fig. 6 is a top plan view of another form of liquid aerating and dispensing device embodying features of the invention, parts being broken away; and, Fig. 7 is a side view of the form shown in Fig. 6, the upper portion being shown in section better to illustrate the interior construction.

Food products aerating devices of the kind herein contemplated are useful in places such as soda fountains, restaurants, bakeries and private kitchens. It is highly desirable, especially in public food preparing places, that they be capable of being thoroughly cleaned with a minimum expenditure of time and effort, yet prior to the present invention, they have always required the removal and reassembly of a considerable number of parts in order to be cleaned. A salient feature of the present construction resides in its formation from a limited number of parts especially arranged to promote easy and rapid cleaning and to overcome the operator's previous natural reluctance to undertake this task as frequently as he should.

Other previously encountered difficulties overcome by the present novel construction were due to gas leakages in the vicinity of the charging valve. In prior cream whipping or charging devices, this valve, together with its associated piercing pin, was held in place by a deep compressible rubber gasket which accommodated and gripped the neck of a cartridge containing the charging gas. Back pressure on this valve frequently caused it to move bodily against its gasket, compressing the latter, unless the cartridge were kept screwed in its innermost charging position, and such bodily movement of the valve permitted pressure leakage around the outside of the valve body, even though the valve itself were functioning properly. In accordance with the present invention, the charging valve is rigidly held in place and cannot move bodily so as to permit such leakage. Accordingly, with the present device, it is not necessary to keep the discharged cartridge screwed to the apparatus, and it is therefore possible to effect successive charges with two or more cartridges, enabling larger containers to be employed when desired, and adding to the compactness and sightliness of the device while in dispensing use. Also, the previously used deep gripping gaskets frequently became frictionally engaged over the cartridge neck with such force that removal of the latter pulled out the gasket, stripping or unthreading the gasket retaining collar. As will be seen, the present construction affords a leak-proof seal during charging while avoiding such undesired strong gripping action between cartridge and gasket, and effectively overcomes or avoids other previously encountered difficulties such as those mentioned.

Referring more particularly to the drawings and first to Figs. 1 to 5, there is shown a charging and dispensing head generally designated 10 having a gas inlet passage 11, a fluid or cream outlet passage 12 and a needle valve passage 13. The inlet and outlet passages lead to the interior of a threaded cap portion 14. The latter is adapted to be screwed over the correspondingly threaded neck of a liquid container (not shown in Figs. 1 to 5) to provide a closure for the latter and is adapted to clamp the upper gasket of a siphon tube, of the kind shown, for example, in Fig. 7, between such neck and the interior surface of the cap, with the tube in communication with passages 11 and 12.

The cap portion may be externally threaded for attachment to some types of containers, in which case the siphon tube may be associated with the head in any suitable manner. When the head is attached to one among a number of alined soda-fountain containers, it may preferably carry a locating lug, such as 10', adapted to engage a notch or lug on the container located so as properly to orient the dispensing spout.

The head 10 and particularly its cap portion 14 may, when desired, be enlarged downwardly to include an external skirt portion (not illustrated) so as to act not only as a closure for a container, but as a considerable portion of the container itself. Accordingly, it will be understood that the term "head" as employed in the present description and claims, refers to an element associated with or even forming part of a container for the substance under aeration.

The inlet or charging passage 11 extends outwardly through a conduit 15, the outer end of which is exteriorly threaded at 16 to accommodate a cartridge holder 17. These threads are of high pitch, on the order of from eight to four threads to the inch, to enable the cartridge holder rapidly to drive its contained cartridge 18 to gas discharging position. This construction has the advantage of enabling the operator to drive the cartridge into sealed communication with the charging valve piercing pin, hereinafter described, almost instantaneously with a single quick turn of the cartridge holder, thus avoiding leakages previously encountered through relatively slow penetration of the cartridge by the piercing pin. It is contemplated that other suitable means for obtaining this rapid cartridge seating action may be provided. For example, a hand operated driving cam (not shown) may be rotatably mounted in the rear of the holder in position to engage and quickly push the cartridge into sealed engagement with the piercing pin. The holder 17 is of thimble shape with solidly enclosed sides and is adapted to be loaded from its open end. This prevents the operator's hand from contacting the cartridge, which during the charging operation is subjected to extreme cooling because of the rapid expansion of its contained gas and has, in the past, frequently caused painful "burns" because of the non-enclosed form of holders heretofore in use.

The outer end of conduit 15 is also interiorly threaded at 19 for reception of a combination valve sleeve member and valve unit. The sleeve member, designated 20, which is of metal or other rigid material, is of generally tubular form being externally threaded for insertion in the conduit 15 and terminating, in the uncompleted form shown in Fig. 3, in a downwardly extending neck 21 near the upper portion of which is an internal annular shoulder 22 against which a unitary back-pressure valve and piercing pin element is adapted to abut. The sleeve member has a restricted entrance 23 at its outer end adapted freely to accommodate the neck of cartridge 18, the interior 24 of the seat member being somewhat larger in internal diameter than opening 23 and affording a chamber for carrying a readily compressible rubber cartridge sealing gasket 25 (Fig. 2). The valve and piercing pin element comprises a piercing pin 26 the upper end of which is beveled or sharpened to penetrate the metal sealing diaphragm of cartridge 18 when the latter is forcibly urged thereagainst. The piercing pin is mounted in a valve casing 27 having an outwardly extended flange 28 which is butted against shoulder 22 whereupon the neck 21 is spun over against flange 28, serving firmly and rigidly to hold the casing 27 and valve sleeve 20 together as a unit. A back pressure valve is located within housing 27 adjacent the inner end of the hollow piercing pin and comprises an elastic band 29 stretched across a centrally perforate ring 30 in position to abut the lower end of the piercing pin under back pressure, but to stretch therefrom under charging pressure and permit incoming gases to pass through the open inner end of the housing 27 into the inlet passage 11. Of course, other suitable forms of back pressure valves may be utilized in association with the piercing pin, as desired. The particularly described valve is, however, a convenient and preferred form. A gasket 31 is preferably provided between the underside of the valve seat member and a shoulder or seat 32 in the conduit 15. This gasket preferably snugly fits the valve housing 27 for movement with the valve and sleeve unit. This entire unit, including the cartridge sealing gasket 25, is insertable within threads 16 in a single operation, suitable notches 33 (Fig. 4) being provided to facilitate use of a screw driver for this purpose. When this unit is screwed in with gasket 32 firmly in place between the main head 10 and the valve sleeve member, the valve and piercing pin element is firmly held in place by rigid parts, and cannot yield bodily outwardly under back pressure obtaining within the fluid container. This prevents any seepage of gas around the outside of the valve, while the back-pressure valve 29 prevents any backflow through the hollow piercing pin. Compressible cartridge sealing gasket 25 is of such diameter that it may be snugly fitted through but retained within the opening 23 and, in its uncompressed condition, is of a thickness approximately equivalent to or somewhat greater than the height of the portion of piercing pin 25 which projects beyond the valve housing.

During a charging operation a cartridge 18, which contains a suitable gas under high pressure, is loaded in the holder 17 and the latter is then screwed down over threads 16 until the face of the cartridge abuts gasket 25. A quick turn on the cartridge holder then forces the neck of the cartridge to compress sealing gasket 25 and at the same time forces the cartridge sealing diaphragm against the piercing pin which punctures it and causes the gas to pass through the charging valve and into passage 11, whence it passes downwardly through the siphon tube and into the food product in the container.

When this product is cream or milk or mixtures of the two, a suitable gas for use in the cartridge 18 is nitrous oxid which is preferably employed because of its neutral or harmless effect on such liquids. However, other products and other suitable gases or gaseous compounds may be employed as desired, any relatively stable gas having a high oxygen content and an ability to mix properly with whatever food product is under aeration being suitable. The cartridge may contain about 8½ grams of gas when it is to be mixed with one pint of milk or cream, and this gas should be compressed sufficiently so that when expanded in a container of about 26 fluid ounces capacity, the resultant pressure within the container will be on the order of approximately 90 to 100 pounds per square inch.

Heretofore, the means for dispensing creams under pressure has involved spring loaded plunger valves having a relatively high number of separate parts and being incapable of delicate control. The opening of these spring loaded valves usually resulted in the sudden freeing of the dispensing passage and permitted the aerated cream to spurt or gush through the dispensing spout or passage with considerable force. This was obviously undesirable when applying creams to soups or other fluids subject to splashing and made it impractical to attempt to lay the cream in designs or patterns as is done, for example, in decorating bakery and other products.

In accordance with the present arrangement, the dispensing valve is of the needle type and comprises a valve stem 34 terminating in a conical valve surface adapted to seat against a conical valve seat 35 provided in the outlet passage 12 where the latter meets the valve passage 13. The upper portion of this valve stem is threaded at 36, the threads being of relatively fine pitch and screwed into a gland or bushing member 37 which in turn is threaded at 38 into the valve passage 13. The under end of this gland firmly abuts a rubber washer 39, and, if desired, it may be recessed to provide a stop shoulder for a split ring 40 carried in a groove on the valve stem to serve as a limiting abutment against undue upward movement of the latter. The upward end of gland 37 may be formed hexagonally (not shown) to accommodate a wrench, and/or may be fitted with an outwardly extending flange 41 capable of providing a knurled finger grip for screwing the gland into or out of the head 10. The extreme upper end of the valve stem has a handle 42 fixed to it to effect the opening and closing of the valve. The needle valve may be rotated very slightly so as slowly and restrictedly to free the outlet passage 12. By this means, the cream can, when desired, be slowly extruded and its rate of emission can be adequately controlled.

The entire dispensing valve construction including the valve stem and gland are adapted to be removed as a unit by simply unscrewing such gland 37 from the head 10. The washer 39 preferably embraces the valve stem sufficiently snugly to be removable therewith.

In order to clean the device only two major parts need be removed from the head 10, namely, the charging valve unit threaded into place at 19, and the dispensing valve unit threaded into place at 38, and these can each be removed in a single unscrewing operation. The entire head 10 is then free of all extraneous parts and may easily be flushed with water. This head is of simple design and its passages are of open construction free of pockets or corners where bacteria might collect. The reassembly of the charging valve and dispensing valve units is similarly easy and quick, requiring only the two mentioned screwing operations.

The head and most of its associated parts may preferably be made of cast metal or metallic alloys, or of molded plastic compounds, and designed to harmonize in general appearance with soda fountain or like equipment. The container and siphon used with this device are also preferably of like materials for the sake of strength.

The head described in Figs. 1 and 2 is particularly well suited for casting from metals or alloys. It will be noted that its walls are substantial but of relatively thin and uniform measurement throughout, without any unduly massive bodies of metal incorporated in the casting. This avoids or highly minimizes formation of pores, gas pockets and fissures during the casting and subsequent cooling of the head, which are almost impossible to avoid in thick or massive castings of metals or alloys of the kinds used in such heads. The presently described head is far denser and less porous or permeable than others heretofore in use on aerating and dispensing devices. Less metal may be used in forming the present head and this consequently may be of superior quality. The head is cast integrally, without embedded inserts or bushings such as have been previously used at the valve portions or elsewhere where non-porosity and good machining qualities are required. Heretofore where such inserts have been cast into the head, leakage and other difficulties have been encountered, particularly when the head and insert had unlike coefficients of thermal expansion. Also, the pressure from within the container is directed against a comparatively restricted zone of the metallic head, and this zone is largely protected by the non-porous rubber siphon gasket so that leakage due to porosity of the casting is avoided or highly minimized. Because of such features of design and construction, manufacturers of the present head can and do guarantee it against container pressures far higher than any they have heretofore been willing to specify with previous designs of heads involving relatively thick or massive body portions. This gives the present head a much higher safety and anti-leakage factor.

In Figs. 6 and 7, another form of aerating and dispensing device is shown which is of a type well suited for use in private kitchens. Here, the head 110 is preferably made of a suitable moldable composition material such as the various synthetic resinous compounds, or the like, which are available for this type of construction. The head 110 has an inlet passage 111, an outlet passage 112 and a valve passage 113. The inlet passage 111 is substantially entirely confined within the head 110 which is more or less streamlined, as illustrated, in the sense that it has few projecting parts.

The passage 111 is internally threaded at 44 to accommodate an insert 45 for mounting a combined valve sleeve and valve unit comprising parts 20, 27, 31, etc., identical with those described in connection with the first form. This unit is threaded at 119 into the interiorly threaded outer end of insert 45 and carries a piercing pin 26 and cartridge sealing gasket 25. A cartridge 18 is adapted to be driven into charging relation with the piercing pin by a holder 117, having solid sides, and having an externally threaded lower end adapted to be screwed at 116 into the interior threads provided on a boss 115 which surrounds the insert 45. The threads at 116 are at a steep pitch causing rapid driving of the cartridge against the piercing pin and gasket so as to avoid leakage.

The dispensing valve is of the needle type, having a stem 134 threaded within a gland or bushing 137 which in turn is threaded within the upper end of valve passage 113 in the head 110. A washer 139 is provided below this gland. The upper end of the valve stem 134 has a handle 142 fixed to it. This handle is of convex form, preferably being molded from composition material and is contoured to merge gracefully with the head 110. The valve gland 137 has a flange or disc 141 keyed or spun to it, and the outer periphery of this is knurled and located in substantial alignment with the handle 142 and head 110 where it can readily be manually gripped. The entire dispensing valve construction can be disassembled and assembled by rotating the flange 141. The charging valve construction likewise can be removed and reinserted simply by screwing the insert 45, the latter with its associated parts forming a single removable unit.

The entire head 110 acts as a closure for a container 46, preferably of metal, having an outwardly threaded neck 47 over which the head screws and to which it clamps the rubber gasket 48 of a siphon tube 49, the interior of which is in communication with the charging and outlet passages 111 and 112. This tube extends to within about one quarter inch of the bottom of the container and the aerated fluid is adapted to be forced outwardly therethrough under pressure, in a manner which will be readily understood.

The operations to be followed in charging and dispensing fluids, as well as in disassembling and cleaning the device shown in Figs. 6 and 7, will be apparent from a consideration of the similar operations described in connection with the first form.

In both forms of device, it will be seen that the construction is simple and rugged and involves a minimum number of parts which are adapted rapidly and easily to be taken apart, cleaned and put together. The head itself is of dense integral, non-porous construction capable of withstanding leakage and breakage under high pressures. The charging valve unit is firmly and rigidly held in place by metal parts, and affords a leak-proof seal which cannot be disrupted under back pressure and which does not require the continued pressing engagement of the cartridge to keep it in leak-proof condition. The cartridge sealing gasket 25 cannot grip or bind against the cartridge neck and will not be pulled out of the valve seat member when the cartridge is removed. It will thus be seen that the described constructions are well suited to fulfill their intended function.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In an aerating and dispensing device, a charging and dispensing head assembly capable of being attached to a container and forming a closure therefor, said assembly consisting of only three distinct mutually separable units, one unit comprising a head proper containing separate inlet and outlet passages, another unit comprising a dispensing valve means insertable in said outlet passage in position to open or close it, and said remaining unit comprising a charging device insertable in said inlet passage and including a back pressure valve, a piercing pin communicating therewith and a sealing gasket adjacent said pin in position to seal a gas containing cartridge in fluid tight relation therewith, said last named units each being insertable in and removable from said head unit in a single operation.

2. In an aerating device, the combination comprising, a head adapted to be attached to a container to form a closure therefor, said head having an internally threaded inlet passage having a sealing seat therein, a charging unit comprising a piercing pin, a back-pressure valve in communication therewith, an externally threaded sleeve of rigid material fixedly attached to said pin and valve, a compressible gasket carried within said sleeve and surrounding the piercing end of said pin, and an external gasket snugly fitted to said unit in position to bear against said sealing seat when said sleeve is screwed into said passage.

3. In an aerating device, the combination comprising, a head adapted to be attached to a container and to form a closure therefor, said head having an inlet passage, a hollow piercing pin, a back-pressure valve in communication therewith, a casing carrying said valve and pin and having an external annular flange, a sleeve of rigid material fixed to said flange, and a compressible gasket located in said sleeve and surrounding the piercing end of said pin, said sleeve being removably inserted in said passage.

4. In an aerating device, the combination comprising, a head adapted to be attached to a container and to form a closure therefor, said head having an inlet passage, an internally threaded hollow boss on said head at the outer end of said passage, a tubular insert removably attached in said passage and spaced inwardly from said boss, a hollow piercing pin carried by said insert, and an externally threaded cartridge holder adapted to be screwed into said boss to engage a gas containing cartridge with said pin.

5. A charging valve unit adapted to be fixed in an inlet passage of a food products aerating device, comprising, a hollow piercing pin, a back-pressure valve in communication therewith, a sleeve of rigid material fixedly attached to said pin and valve, and a compressible gasket carried by said sleeve and surrounding the piercing end of said pin.

6. A charging valve unit adapted to be fixed in an inlet passage of a food products aerating device, comprising, a hollow piercing pin, a back-pressure valve in communication therewith, a casing holding said valve and pin and having an external annular flange, a metal sleeve rigidly fastened to said flange with the piercing end of said pin extending therewithin, and a compressible gasket carried within said sleeve and surrounding the piercing end of said pin.

7. In an aerating and dispensing device, the combination comprising, a head adapted to be attached to a container and to form a closure therefor, said head having an inlet passage and an outlet passage, a valve seat in said outlet passage, a needle valve engageable against said seat to close the passage, an internally and externally threaded gland removably screwed into said head, said valve having a threaded stem screwed into said gland, a circular operating handle on the outer end of said stem, an outwardly extending circular flange of approximately the diameter of said handle underlying such handle and fixed to said gland, and means in said inlet passage for introducing a charge of gas into said container.

8. A charging valve unit adapted to be fitted in an inlet passage of a food products aerating device having an outer end adapted to be brought into communication with a gas containing cartridge and an inner end adapted to be in communication with the interior of the device when the unit is mounted in position, comprising, a sleeve of rigid material, a hollow piercing pin fixedly attached to said sleeve with the piercing end of the pin accessible to a cartridge when the latter is brought into communication with the outer end of the unit, and a back-pressure valve fixedly attached to said sleeve interiorly of said hollow pin in communication with the passage therethrough.

9. A charging valve unit adapted to be fitted in an inlet passage of a food products aerating device having an outer end adapted to be brought into communication with a gas containing cartridge and an inner end adapted to be in communication with the interior of the device when the unit is mounted in position, comprising, a sleeve of rigid material, a cartridge piercing pin fixedly supported by said sleeve in the outer end of the unit, a passage through the unit to conduct gas from a pierced cartridge to the interior of the device, a back-pressure valve supported on said sleeve to close the passage, and a compressible gasket carried within said sleeve as a part of the unit and surrounding the piercing end of said pin.

HENRY B. W. SNELLING.

CERTIFICATE OF CORRECTION.

Patent No. 2,190,688. February 20, 1940.

HENRY B. W. SNELLING.

It is hereby certified that error appears in the printed specification of the above numbered patent requiring correction as follows: Page 4, second column, line 36, claim 2, before "to" insert and; same page and column, line 71, and page 5, first column, lines 5 and 31, and second column, line 15, claims 5, 6, 8 and 9 respectively, strike out "a food products" and insert instead the word an; and that the said Letters Patent should be read with this correction therein that the same may conform to the record of the case in the Patent Office.

Signed and sealed this 19th day of March, A. D. 1940.

(Seal)

Henry Van Arsdale,
Acting Commissioner of Patents.